United States Patent
Ohara

(10) Patent No.: US 12,414,151 B2
(45) Date of Patent: Sep. 9, 2025

(54) TERMINAL, COMMUNICATION SYSTEM, AND COMMUNICATION METHOD IN A TWO-STEP RANDOM ACCESS PROCEDURE

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 563 days.

(21) Appl. No.: 17/635,542

(22) PCT Filed: Aug. 19, 2019

(86) PCT No.: PCT/JP2019/032321
§ 371 (c)(1),
(2) Date: Feb. 15, 2022

(87) PCT Pub. No.: WO2021/033246
PCT Pub. Date: Feb. 25, 2021

(65) Prior Publication Data
US 2022/0338246 A1    Oct. 20, 2022

(51) Int. Cl.
*H04W 74/00* (2009.01)
*H04W 74/0833* (2024.01)

(52) U.S. Cl.
CPC ..... *H04W 74/004* (2013.01); *H04W 74/0833* (2013.01)

(58) Field of Classification Search
CPC .......... H04W 74/004; H04W 74/0833; H04W 74/0866; H04W 74/0838; H04W 74/0836
See application file for complete search history.

(56) References Cited

U.S. PATENT DOCUMENTS

| | | | | |
|---|---|---|---|---|
| 2018/0206227 A1* | 7/2018 | Jiang | ............. | H04W 72/21 |
| 2021/0136827 A1* | 5/2021 | Xiong | ............. | H04W 74/004 |
| 2021/0345426 A1* | 11/2021 | Liu | ............. | H04W 72/0446 |
| 2021/0378031 A1* | 12/2021 | Chai | ............. | H04W 74/0866 |
| 2021/0392690 A1* | 12/2021 | Hong | ............. | H04W 74/002 |
| 2022/0086827 A1* | 3/2022 | Chai | ............. | H04W 72/1268 |
| 2022/0159746 A1* | 5/2022 | Ko | ............. | H04W 74/0841 |
| 2022/0174703 A1* | 6/2022 | Chai | ............. | H04W 72/1268 |
| 2022/0264653 A1* | 8/2022 | Xiong | ............. | H04L 1/0023 |
| 2022/0287107 A1* | 9/2022 | Kim | ............. | H04W 72/0446 |

OTHER PUBLICATIONS

3GPP TSG RAN WG1 Meeting #98; R1-1908033 "Discussion on channel structure of 2-step RACH" Hauwei, HiSilicon; Prague, Czech Republic; Aug. 26-30, 2019 (14 pages).
3GPP TSG RAN WG1 Meeting #98; R1-1908762 "Channel Structure for Two-Step RACH" Sony; Prague, CZ; Aug. 26-30, 2019 (9 pages).

(Continued)

*Primary Examiner* — Marcus Smith
*Assistant Examiner* — Kai Chang
(74) *Attorney, Agent, or Firm* — Osha Bergman Watanabe & Burton LLP

(57) ABSTRACT

A terminal including: a control unit configured to determine a position of a PUSCH resource to be used in a first step in a two step random access procedure based on a relative position with respect to a position of a preamble resource; and a transmission unit configured to transmit a message of the first step using the preamble resource and the PUSCH resource.

4 Claims, 14 Drawing Sheets

(56) References Cited

OTHER PUBLICATIONS

3GPP TSG RAN WG2 #105bis; R2-1904438 "Consideration of MsgA contents and size" Intel Corporation; Xi'an, China; Apr. 8-12, 2019 (7 pages).

3GPP TSG-RAN WG1 Meeting #98; R1-1909122 "Channel Structure for Two-Step RACH" Ericsson; Prague, CZ; Aug. 26-30, 2019 (15 pages).

3GPP TS 38.211 V15.6.0 "3rd Generation Partnership Project; Technical Specification Group Radio Access Network; NR; Physical channels and modulation (Release 15)" Jun. 2019 (97 pages).

3GPP TS 38.300 V15.6.0 "3rd Generation Partnership Project; Technical Specification Group Radio Access Network; NR; NR and NG-RAN Overall Description; Stage 2 (Release 15)" Jun. 2019 (99 pages).

3GPP TS 38.321 V15.6.0 "3rd Generation Partnership Project; Technical Specification Group Radio Access Network; NR; Medium Access Control (MAC) protocol specification (Release 15)" Jun. 2019 (78 pages).

3GPP TS 38.331 V15.6.0 "3rd Generation Partnership Project; Technical Specification Group Radio Access Network; NR; Radio Resource Control (RRC) protocol specification (Release 15)" Jun. 2019 (519 pages).

International Search Report issued in International Application No. PCT/JP2019/032321, mailed Mar. 17, 2020 (6 pages).

Written Opinion issued in International Application No. PCT/JP2019/032321; Dated Mar. 17, 2020 (5 pages).

Office Action issued in Japanese Patent Application No. 2021-541367, mailed on Oct. 31, 2023 (6 pages).

OPPO; "On Channel Structure for 2-step RACH"; 3GPP TSG RAN WG1 #98, R1-1909222; Prague, Czech; Aug. 26-30, 2019 (13 pages).

Office Action issued in Japanese Patent Application No. 2021-541367, mailed on Jan. 16, 2024 (6 pages).

Sony; "Considerations on Channel Structure for Two-Step RACH"; 3GPP TSG RAN WG1 Meeting #97, R1-1906848; Reno, USA; May 13-17, 2019 (4 pages).

\* cited by examiner

FIG.10
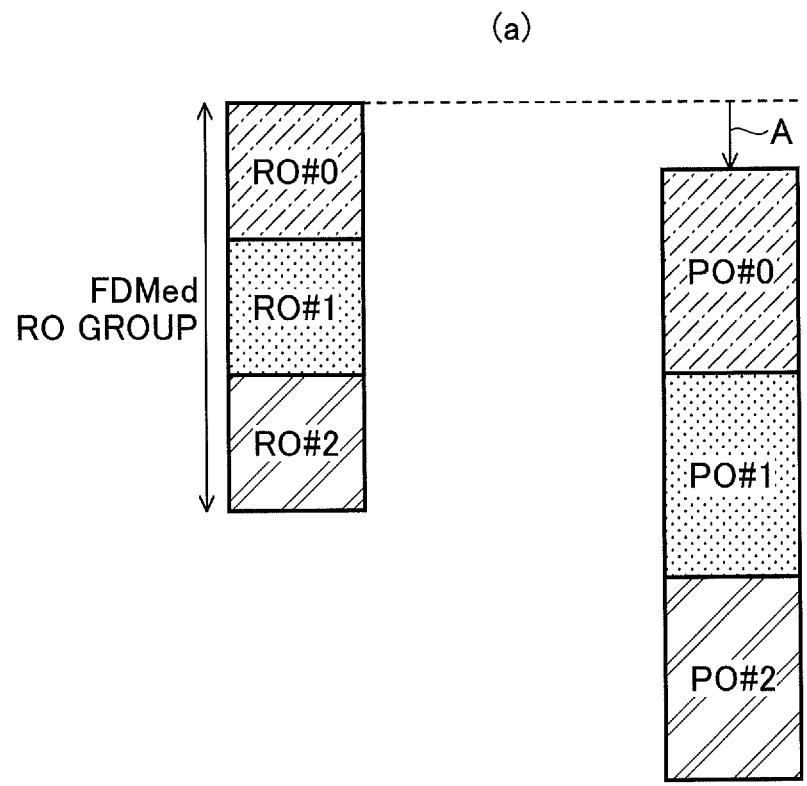
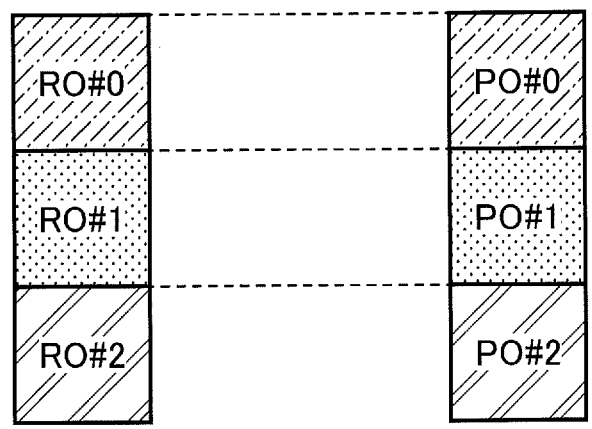
RO: RACH occasion
PO: PUSCH occasion

FIG.12
(a)
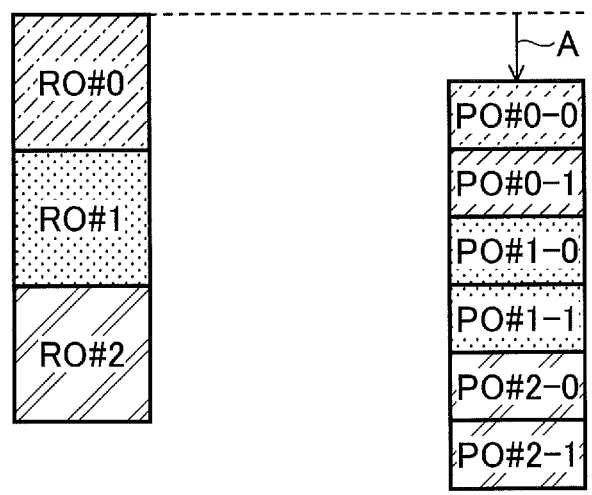
(b)
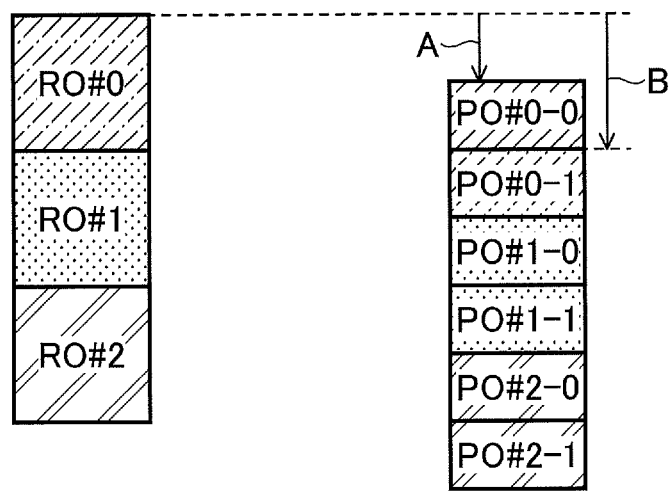
RO: RACH occasion
PO: PUSCH occasion

FIG.13
(a)
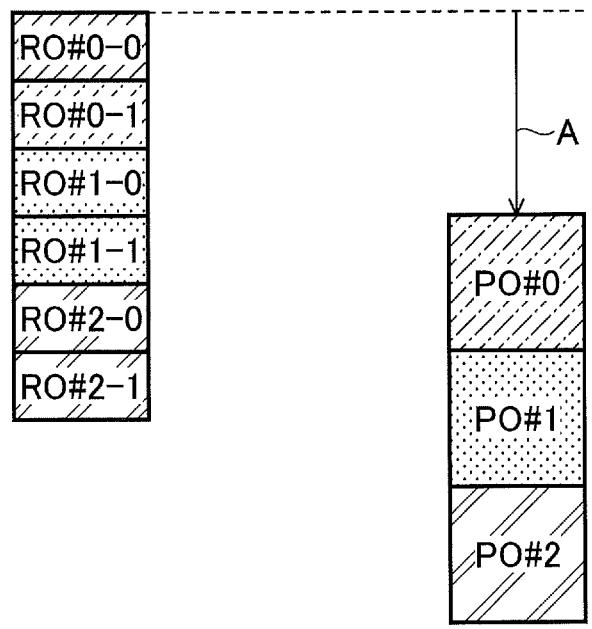
(b)
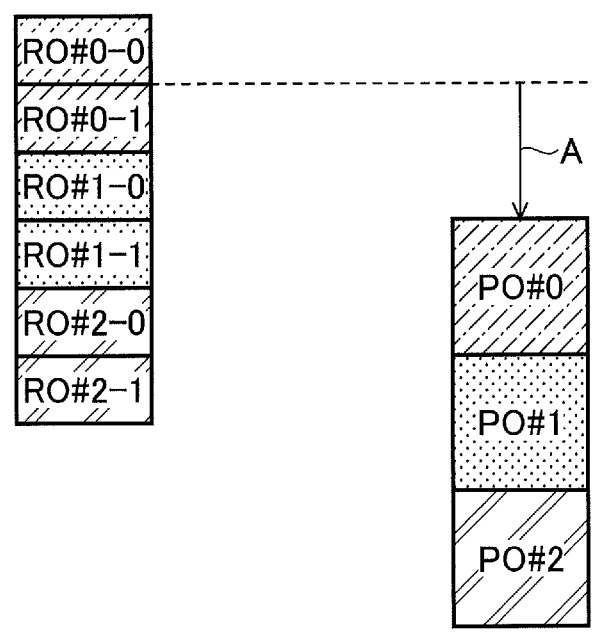

TERMINAL, COMMUNICATION SYSTEM, AND COMMUNICATION METHOD IN A TWO-STEP RANDOM ACCESS PROCEDURE

TECHNICAL FIELD

The present invention relates to a user terminal in a wireless communication system.

BACKGROUND ART

In 3GPP (3rd Generation Partnership Project), a wireless communication system referred to as NR (New Radio) or 5G have been studied to achieve higher capacity system, higher data transmission speed, lower delay in radio sections, and the like. In 5G, various wireless technologies and network architectures are being studied in order to satisfy the requirement that the delay of the radio section be 1 ms or less while achieving a throughput of 10 Gbps or more (for example, see Non-Patent Document 1).

PRIOR ART DOCUMENTS

Non-Patent Documents

[Non-Patent Document 1] 3GPP TS 38.300 V15.6.0 (2019-06)
[Non-Patent Document 2] 3GPP TS 38.321 V15.6.0 (2019-06)
[Non-Patent Document 3] 3GPP TS 38.331 V15.6.0 (2019-06)
[Non-Patent Document 4] 3GPP TS 38.211 V15.6.0 (2019-06)

SUMMARY OF INVENTION

Problem to be Solved by the Invention

In NR, a random access procedure similar to LTE is specified (Non-Patent Document 2). Further, in NR, in order to reduce latency and reduce power consumption, a random access procedure executed by 2 steps (referred to as two-step RACH) has been started.

In a two-step RACH, in the first step, it is assumed that the user terminal transmits a MsgA by using both a preamble resource and a PUSCH resource. However, it is not clear how to specify a PUSCH resource for the MsgA. Therefore, there is a problem that the user terminal cannot properly determine the PUSCH resources used in the first step.

The present invention has been made in view of the foregoing, and is intended to provide a technique that allows the user terminal to determine appropriately a PUSCH resource used in a first step in a two-step random access procedure.

Means for Solving Problems

According to the disclosed technique, there is provided a terminal comprising: a control unit configured to determine a position of a PUSCH resource to be used in a first step in a two step random access procedure based on a relative position with respect to a position of a preamble resource; and a transmission unit configured to transmit a message of the first step using the preamble resource and the PUSCH resource.

Effects of the Invention

According to the disclosed technique, in a two-step random access procedure, a technique is provided that allows the user terminal to properly determine a PUSCH resource used in the first step.

BRIEF DESCRIPTION OF DRAWINGS

FIG. 10 is a diagram for explaining Example 3-2;
FIG. 12 is a diagram for explaining Example 5-1;
FIG. 13 is a diagram for explaining Example 5-2.

MODE FOR CARRYING OUT THE INVENTION

An embodiment of the present invention will be hereinafter described with reference to drawings. The embodiment described below is an example, and the embodiment to which the present invention is applied is not limited to the following embodiment.

In operation of a wireless communication system according to the embodiment of the present invention, existing techniques are used as appropriate. An example of existing technique includes an existing NR or LTE, but the existing technique is not limited to the existing NR or LTE.

In this specification, terms used in the specifications of NR or LTE, such as PUSCH, PDCCH, RRC, MAC, DCI, and the like are used, but those expressed by channel names, protocol names, signal names, function names, and the like used in this specification may be referred to as other names. Also, in the following description, "time domain" and "frequency domain" may be replaced with "time region" and "frequency region" respectively.

(System Configuration)

Figure 1:
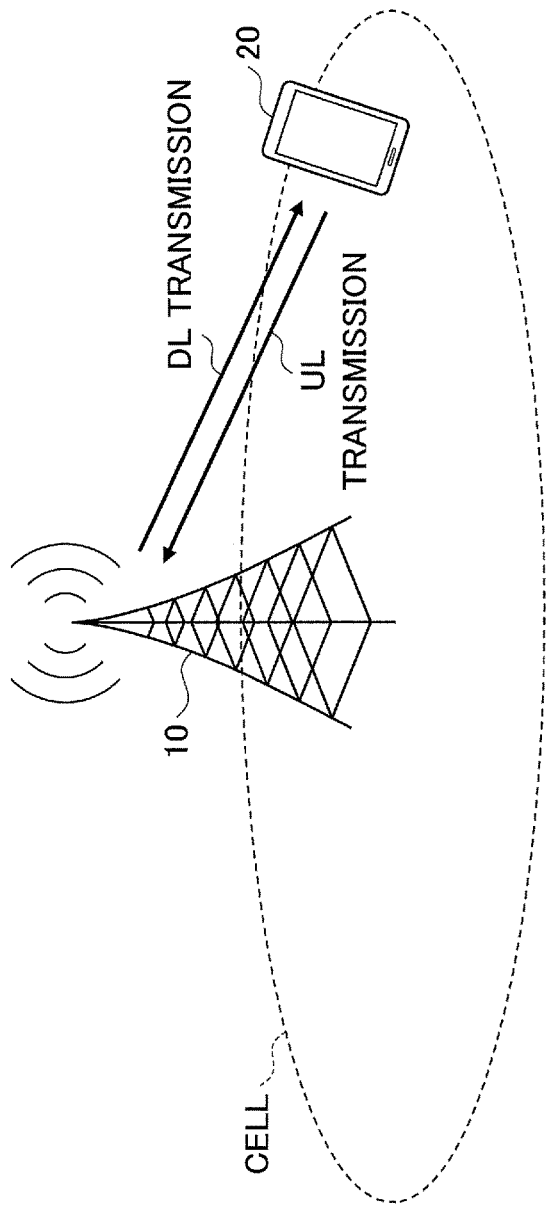
FIG. 1 is a diagram for explaining a wireless communication system according to an embodiment of the present invention.

FIG. 1 is a drawing for explaining a wireless communication system according to an embodiment of the present invention. As illustrated in FIG. 1, the wireless communication system according to the embodiment of the present invention includes a base station apparatus 10 and a user terminal 20. In FIG. 1, one base station apparatus 10 and one user terminal 20 are illustrated, but this is only an example. Alternatively, a plurality of base station apparatuses 10 and user terminals 20 may be provided.

The base station apparatus 10 provides one or more cells, and is a communication apparatus wirelessly communicating with the user terminal 20. The physical resource of a radio signal is defined by time domain and frequency domain. Time domain may be defined by OFDM symbol number. Frequency domain may be defined by the number of subcarriers or the number of resource blocks. It should be noted that a TTI (Transmission Time Interval) in the time domain may be a slot, or a TTI may be a subframe.

The base station apparatus 10 transmits a synchronization signal and system information to the user terminal 20. The synchronization signal is, for example, NR-PSS and NR-SSS. The system information is transmitted in, for example, NR-PBCH or PDSCH and is also referred to as broadcast information. As illustrated in FIG. 1, the base station apparatus 10 transmits a control signal or data to the user terminal 20 through DL (Downlink), and receives a control signal or data from the user terminal 20 through UL (Uplink). It should be noted that, here, those transmitted in control channels such as PUCCH, PDCCH, and the like are referred to as control signals, and those transmitted in shared channels such as PUSCH, PDSCH, and the like are referred to as data, but such a way in which the signals are referred to is only an example. The user terminal 20 may be referred to as "terminal".

The user terminal 20 is a communication apparatus equipped with a wireless communication function such as a smartphone, a mobile phone, a tablet, a wearable terminal, and a communication module for M2M (Machine-to-Machine). As illustrated in FIG. 1, the user terminal 20 receives control signals or data from the base station apparatus 10 in DL, and transmits control signals or data to the base station apparatus 10 in UL, thereby using various communication services provided by the wireless communication system. It should be noted that the user terminal 20 may be referred to as a UE, and the base station apparatus 10 may be referred to as a gNB.

Figure 2:
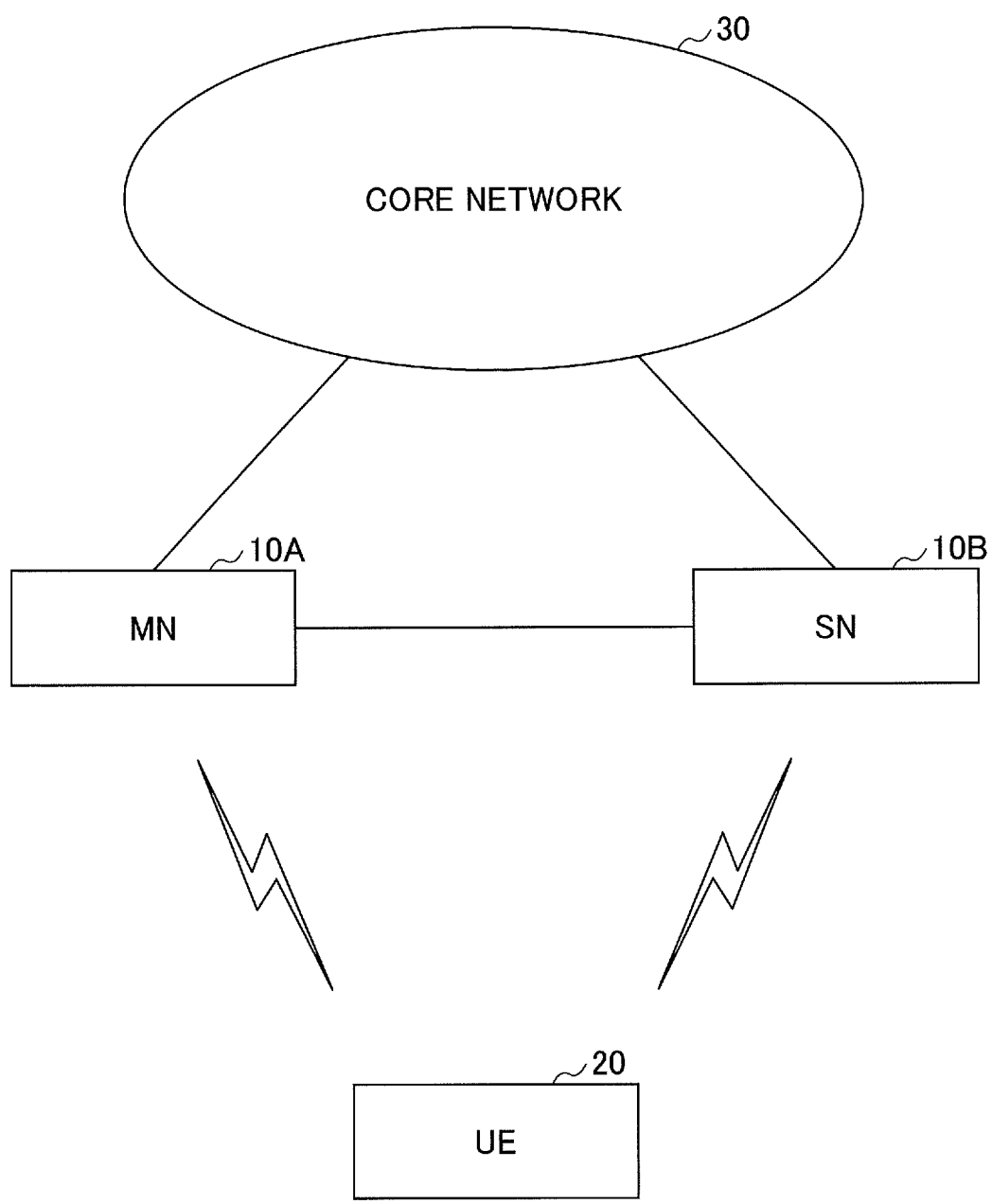
FIG. 2 is a diagram for explaining a wireless communication system according to an embodiment of the present invention.

FIG. 2 shows an example of a configuration of a wireless communication system when DC (Dual connectivity) is executed. As shown in FIG. 2, a base station apparatus 10A serving as an MN (Master Node) and a base station apparatus 10B serving as an SN (Secondary Node) are provided. The base station apparatus 10A and the base station apparatus 10B are each connected to a core network. The user terminal 20 can communicate with both the base station apparatus 10A and the base station apparatus 10B.

The cell group provided by the base station apparatus 10A that is an MN is called a MCG (Master Cell Group), and the cell group provided by the base station apparatus 10B that is an SN is called a SCG (Secondary Cell Group).

The processing operation according to this embodiment may be performed in the system configuration shown in FIG. 1, in the system configuration shown in FIG. 2, or may be performed in other system configurations.

(Random Access Procedure)

Figure 3:
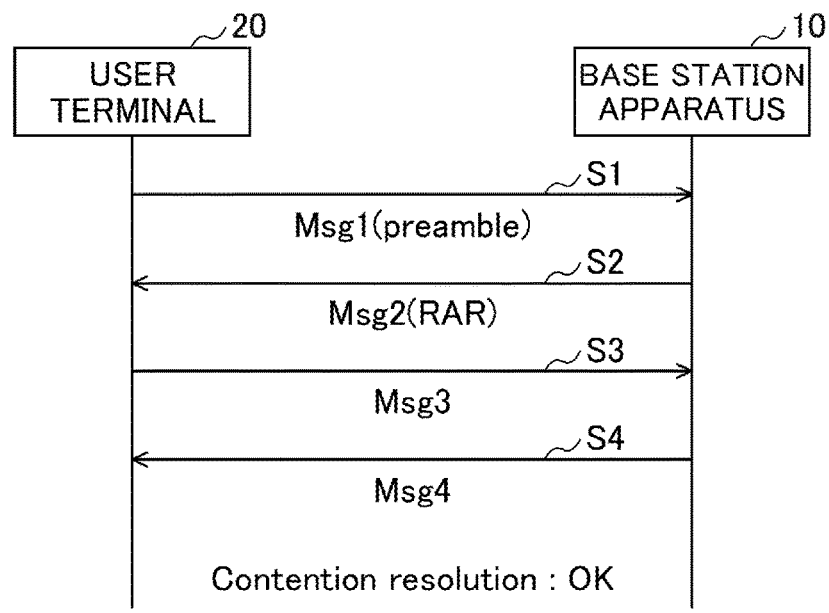
FIG. 3 is a diagram showing a four-step RACH.

First, an example of a four-step random access procedure executed by a wireless communication system according to the present embodiment will be explained with reference to FIG. 3. In the present embodiment, a CBRA (Contention based Random Access), in which the number of steps is to be reduced, will be explained. In CFRA (Contention Free Random Access), the random access procedure is basically completed when the UE receives Msg2, and therefore, CFRA already has a less number of steps. However, the present invention is not limited to CBRA, and the present invention may be applied to CFRA.

In NR, a random access procedure may be executed by selecting an SS/PBCH block (which may be referred to as an SSB, or may be referred to as a synchronization signal block or a synchronization signal), or a random access procedure may be executed by selecting a CSI-RS (Channel State Information-Reference Signal).

For example, the base station apparatus 10 transmits an SSB (or CSI-RS) for each beam, and the user terminal 20 monitors an SSB (or CSI-RS) of each beam. The user terminal 20 selects, from among a plurality of SSBs (or CSI-RSs), an SSB (or CSI-RS) which is received at a reception power higher than a predetermined threshold, and uses a PRACH resource (PRACH occasion) corresponding to the selected SSB (or CSI-RS) to transmit Message1 (Msg1 (=RA preamble)) (S1 of FIG. 3). Hereinafter, for the sake of convenience, an RA preamble will be referred to as a preamble. Also, RACH occasion may be referred to PRACH occasion.

When the base station apparatus 10 detects a preamble, the base station apparatus 10 transmits a Message2 (Msg2 (=RAR)), which is a response thereto, to the user terminal 20 (S2). The user terminal 20 having received Msg2 transmits a Message3 (Msg3) including predetermined information to the base station apparatus 10 (S3).

The base station apparatus 10 having received Msg3 transmits a Message4 (Msg4) to the user terminal 10 (S4). When the user terminal 10 confirms that the predetermined information is included in the Msg4, the user terminal 10 recognizes that the Msg4 is a Msg4 addressed to the user terminal 20 corresponding to the Msg3 (Contention resolution: OK).

Since the above random access procedure includes four steps, the above random access procedure is referred to as a four-step RACH.

Figure 4:
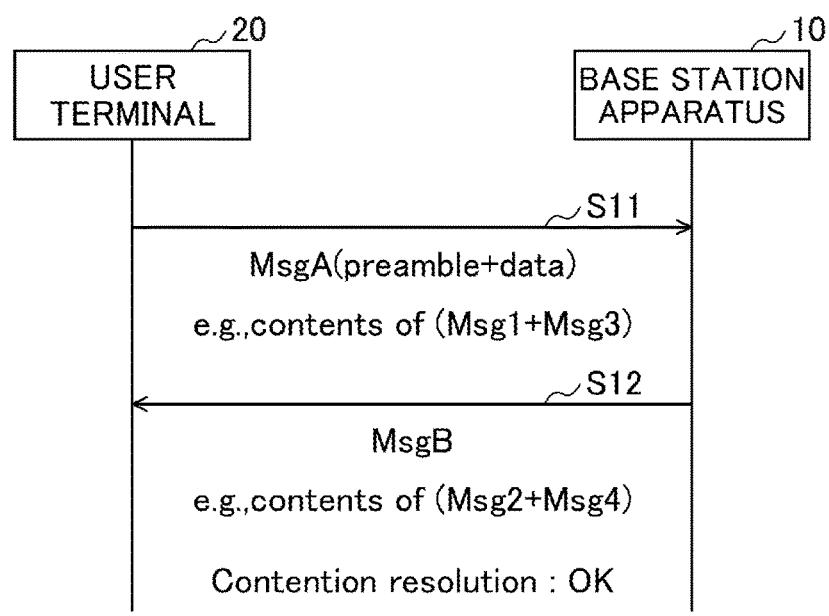
FIG. 4 is a diagram showing a two-step RACH.

Next, a random access procedure in which the number of steps is reduced in order to reduce delay and power consumption will be described with reference to FIG. 4.

In S11, the user terminal 20 transmits a MessageA (MsgA) having a preamble and data to the base station apparatus 10. As an example, the user terminal 20 selects a PRACH resource in the same manner as the selection of a PRACH resource in the four-step RACH and transmits the preamble by the PRACH resource, and transmits the data by a PUSCH resource (referred to as PUSCH Occasion) associated with the PRACH resource. Note herein that the preamble and the data correspond to Msg1 and Msg3, for example, in the four-step RACH.

In S12, the base station apparatus 10 transmits a MessageB (MsgB) to the user terminal 20. The content of the MsgB corresponds to, for example, Msg2 and Msg4 in a four-step RACH.

Since the above random access procedure consists of two steps, this is called a two-step RACH. The two-step RACH is an example of a random access procedure that reduces the number of steps.

It is assumed that the preamble and the PUSCH in the two-step RACH are not one body from the viewpoint of at least physical layer. For example, messages transmitted by separate physical resources that are the preamble resource and the PUSCH resource are collectively called a MsgA.

In other words, it is assumed that one MsgA PUSCH occasion is a single MsgA PUSCH resource and one MsgA RACH occasion is a single MsgA preamble resource. "One resource" means a resource used for transmission of one time. Hereinafter, the MsgA PUSCH occasion and the MsgA RACH occasion are called a PUSCH occasion and a RACH occasion, respectively.

In the present embodiment, the RACH occasion is configured to the user terminal 20 by a RRC message (RACH config). Meanwhile, with regard to the PUSCH occasion, a correspondence relation between the PUSCH occasion and the RACH occasion is defined, and the user terminal 20 determines the PUSCH occasion based on the correspondence relation.

The correspondence relation between a PUSCH occasion and a RACH occasion may be one-to-one, many-to-one, one-to-many, or many-to-many.

Considering delay and the like, it is desirable to place the RACH occasion and the PUSCH occasion as close as possible in the time domain, but not limited to a close position.

In this embodiment, as a resource designation method for a PUSCH occasion, the resource is specified by a relative position from a corresponding RACH occasion. However, this is an example, and the resource of the PUSCH occasion may be specified as an absolute position.

As for a RACH occasion, depending on its configurations, various time lengths, cycles, and resource densities are assumed. Thus, resource designation for a PUSCH occasion that can be used in such various cases is defined.

(Basic Operation Example)

A specific method of resource designation of a PUSCH occasion will be described with reference to Examples 1 to 5, but first, a basic operation example will be described with reference to FIG. 5.

In S101, the base station apparatus 10 transmits an RRC message to the user terminal 20 for configuring one or more RACH occasions (which may be called RACH resources). The RRC message may configure a relative position of a PUSCH occasion (also referred to as a PUSCH resource) relative to a RACH occasion, or it may configure an absolute position of the PUSCH occasion. The RRC message also includes broadcast information (it may be called system information) such as SIB (System Information Block).

The relative position of a PUSCH occasion for a RACH occasion may be specified in the specification, etc., and the configuration from the base station apparatus 10 to the user terminal 20 may not be performed. That the relative position is defined by the specification and the like means that the user terminal 20 holds information of the relative position in a storage device such as a memory in advance.

In S102, for example, the user terminal 20 selects one SSB having a received power greater than a threshold value from among a plurality of SSBs and determines a RACH occasion corresponding to the selected SSB. The determined RACH occasion is one of one or more RACH occasions configured in S101.

In this embodiment, a position of a PUSCH occasion is defined as a position relative to a RACH occasion. Therefore, that the user terminal 20 specifies a RACH occasion means that the user terminal 20 also specifies a PUSCH occasion corresponding to the RACH occasion (i.e., at the relative position) at the same time.

In S103, the user terminal 20 transmits a MsgA (=preamble (Msg1)+data (Msg3)) to the base station apparatus 10 using the RACH occasion and the PUSCH occasion specified in S102. In S104, the user terminal 20 receives a MsgB from the base station apparatus 10.

Hereinafter, Examples 1 to 5 will be described as examples of a method for specifying a resource of a PUSCH occasion.

In the following description, a preamble resource may be referred to as a PRACH resource or a PRACH occasion. "Resource" here refers to a time and frequency resource, unless otherwise noted.

Example 1

In Example 1, a method for specifying a position of a time domain resource of a PUSCH occasion is described. That is, in Example 1, how the user terminal 20 determines the position of the time domain resource of the PUSCH occasion will be described.

As for the size (time length) of the time domain resource of the PUSCH occasion, a determination method described in Example 2 may be applied, or a determination method other than the determination method described in Example 2 may be applied.

As for a determination method of a position and a size of a frequency domain resource of the PUSCH occasion, determination methods that will be describe in Examples 3 and 4 may be applied respectively, or determination methods other than those that will be describe in Examples 3 and 4 may be applied respectively.

Since Example 1 is divided into Examples 1-1 and 1-2, each of them will be described in the following.

Example 1-1

In Example 1-1, the user terminal 20 determines a position of time domain of a PUSCH occasion used for transmission of a MsgA based on a relative position from a position (start position or end position) of time domain of a RACH occasion corresponding to the PUSCH occasion.

For example, suppose that the user terminal 20 specifies RACH occasion #1 as a RACH occasion corresponding to a selected SSB. The user terminal 20 knows a time domain resource of the RACH occasion #1 based on configuration made by the base station apparatus 10.

For example, assuming that a start position of the RACH occasion #1 is symbol #0 of slot #1, and that a relative position (start position) of PUSCH Occasion #1 to be used with the RACH occasion #1 for transmission of a MsgA is "2 slots after the start position of the RACH Occasion #1," the user terminal 20 determines that a resource starting from the symbol #0 of the slot #3 is the resource of the PUSCH occasion #1 to be used with the RACH occasion #1 for transmission of the MsgA.

The value of the relative position above represents a time length from the start position of the RACH occasion to the start position of the PUSCH occasion. However, this is an example. The value of the relative position may be a value that indicates a time length from the end position of the RACH occasion to the start position of the PUSCH occasion, a value that indicates a time length from the end position of the RACH occasion to the end position of the PUSCH occasion, a value that indicates a time length from the start position of the RACH occasion to the end position of the PUSCH occasion, or any other value.

In the above example, the time length representing the relative position was specified as "2 slots" in slot units, but it may be specified in units of symbols or may be specified using slots and symbols (e.g., 1 slot+7 symbols). The same applies to Example 1-2.

In addition, when a plurality of RACH occasions having a number of symbols shorter than one slot are configured in the user terminal 20, a plurality of RACH occasions may exist in one RACH slot.

The time length representing the above-described relative position may be a value preconfigured in the user terminal 20 (that is, a value defined by the specification or the like) or a value configured from the base station apparatus 10 to the user terminal 20. This configuration can be done with an RRC message, MAC CE, or DCI. The same applies to the time length representing the relative position in Example 1-2.

Figure 6:
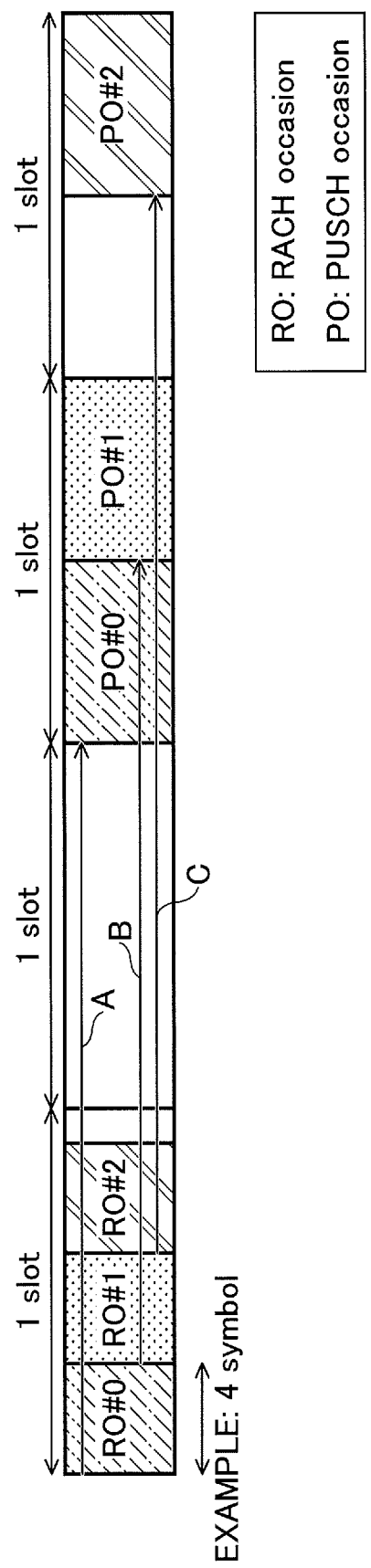
FIG. 6 is a diagram for explaining Example 1-1.

Referring to FIG. 6, an operation example of the user terminal 20 according to the Example 1-1 will be described. In FIGS. 6-13 and their description, "RO" refers to RACH occasion, and "PO" refers to PUSCH occasion.

In FIG. 6, a time domain position of a PO corresponding to a RO is specified as a time length from the start position of the RO to the start position of the PO.

For example, if the user terminal 20 selects RO #2 from among RO #0 to #2 based on received power of a SSB, the user terminal 20 determines a resource, as a resource of PO #2, having a start position a time length after, indicated by C, from the start position of RO #2.

In the example of FIG. 6, for each of PO #0 to #2 corresponding to RO #0 to #2, the time length representing the relative position is separately specified or configured as A, B, and C, respectively. However, this is an example. A time length representing a common relative position for PO #0 to #2 corresponding to RO #0 to #2 may be specified or configured.

Example 1-2

In Example 1-2, the user terminal 20 determines a time domain position of a PUSCH occasion used for transmission of a MsgA based on a relative position from a time domain position (start position or end position) of a slot containing a RACH occasion corresponding to the PUSCH occasion. Example 1-2 is divided into Example 1-2-1, 1-2-2, and 1-2-3, respectively, and each of them will be described.

Example 1-2-1

In Example 1-2-1, a position per PUSCH occasion is specified.

For example, assuming that a slot including RACH occasion #1 is slot #3, and that a relative position (start position) of PUSCH Occasion #1 to be used with the RACH occasion #1 for transmission of a MsgA is "after 1 slot+7 symbols from the start position of a slot including RACH occasion #1," the user terminal 20 determines that a resource starting from symbol #7 of slot #4 is a resource of the PUSCH occasion #1 to be used with the RACH occasion #1 for transmission of a MsgA.

The value of the relative position described above is a value indicating a time length from the start position of a slot including a RACH occasion to the start position of a PUSCH occasion, but this is an example. The value of the relative position may be a value representing a time length from the end position of a slot including the RACH occasion to the start position of the PUSCH occasion, or a value representing a time length from the end position of a slot including the RACH occasion to the end position of the PUSCH Occasion, or a value representing a time length from the start position of a slot including the RACH occasion to the end position of the PUSCH Occasion, or any other value.

Figure 7:
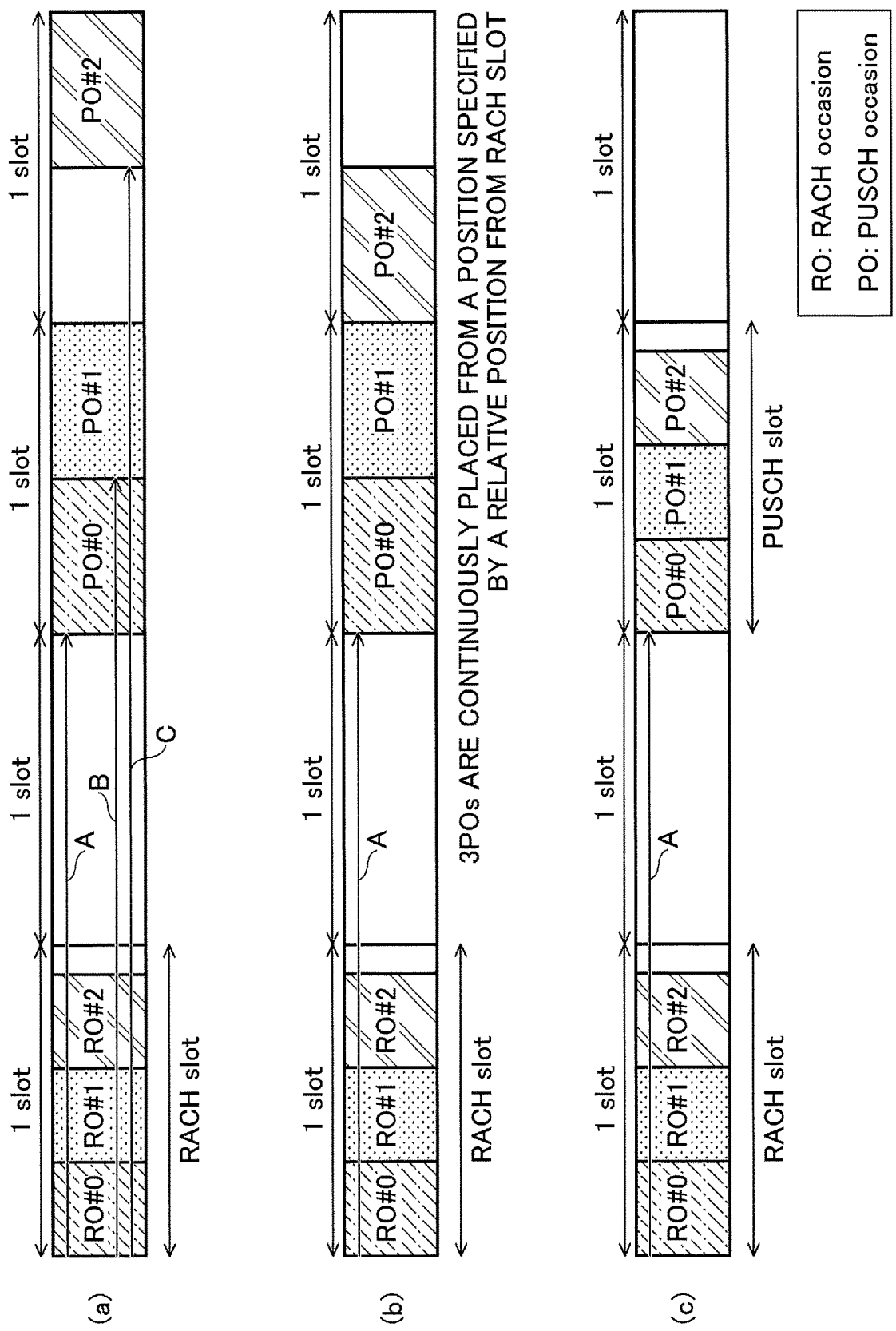
FIG. 7 is a diagram for explaining Example 1-2.

Referring to FIG. 7(*a*), an operation example of the user terminal 20 according to the Example 1-2-1 will be described. In FIG. 7(*a*), a time domain position of a PO corresponding to a RO is specified as a time length from the start position of a slot containing the RO to the start position of the PO.

For example, if the user terminal 20 selects RO #1 from among RO #0 to #2 based on received power of a SSB, the user terminal 20 determines a resource having a start position after a time length indicated by B from the start position of a slot including the RO #1 as a resource of PO #1.

In the example of FIG. 7(*a*), for each of PO #0 to #2 corresponding to RO #0 to #2, a time length representing a relative position is separately specified or configured as A, B, or C. However, this is an example. A time length representing a relative position common to PO #0 to #2 corresponding to RO #0 to #2 may be specified or configured.

Example 1-2-2

In Example 1-2-2, when a plurality of RACH occasions are included in one slot, a relative position is specified in units of "a plurality of PUSCH occasions" corresponding to a plurality of RACH occasions included in the slot.

A method of placement of each PUSCH occasion in "a plurality of PUSCH occasions" may be specified or configured. For example, a method in which a plurality of PUSCH occasions are arranged consecutively, a method in which a plurality of PUSCH occasions are arranged with a gap, or the like may be defined or configured.

For example, suppose that a slot containing RACH occasions #0 to #2 is slot #3, and a relative position (start position) of PUSCH occasions #0 to #2 corresponding to the RACH occasions #0 to #2 are "one slot after the start position of the slot containing the RACH occasions #0 to #2," and that, it is specified or configured that a time length of a single PUSCH occasion is 7 symbols and PUSCH occasions #0 to #2 are arranged continuously (without time gap).

At this time, if the user terminal 20 selects RACH occasion #2, the user terminal 20 determines a resource starting from symbol #0 of slot #5 followed by PUSCH occasions #0 and #1 starting from symbol #0 of slot #4 to be a resource of PUSCH occasion #2 used with RACH occasion #2 for transmission of a MsgA.

The value of the relative position described above is a value indicating a time length from the start position of a slot containing "a plurality of RACH occasions" to the start position of "a plurality of PUSCH occasions." However, this is an example. The value of the relative position may be a value representing a time length from the end position of a slot containing "a plurality of RACH occasions" to the start position of "a plurality of PUSCH occupants," a value representing a time length from the end position of a slot containing "a plurality of RACH occupants" to the end position of "a plurality of PUSCH occupants," a value representing a time length from the start position of a slot containing "a plurality of RACH occupants" to the end position of "a plurality of PUSCH occupants," or any other value.

Referring to FIG. 7(*b*), an operation example of the user terminal 20 according to the Example 1-2-2 will be described. In FIG. 7(*b*), a time domain position of a PO corresponding to a RO is determined by a time length from the start position of a slot containing RO #0 to #2 including the RO to the start position of PO #0 to PO #2 including the PO and a position of the PO in the PO #0 to PO #2.

For example, if the user terminal 20 selects RO #1 from among RO #0 to #2 based on received power of a SSB, the user terminal 20 determines a resource, as a resource of PO #1, arranged next to PO #0 having the start position after a time length represented by A from the start position of a slot including RO #0 to #2 including RO #1.

For example, if a plurality of POs are continuously arranged and each PO is 7 symbols long, the user terminal 20 determines a position 7 symbols after the start position of PO #0 as the start position of PO #1.

Example 1-2-3

In Example 1-2-3, when a plurality of PUSCH occasions are included in one slot, a relative position of "a plurality of PUSCH occasions" is specified as a position of a slot including the "a plurality of PUSCH occasions."

A method of placement of each PUSCH occasion in "a plurality of PUSCH occupants" included in the slot may be specified or configured. For example, a method in which a plurality of PUSCH occasions are arranged consecutively, a method in which a plurality of PUSCH occasions are arranged with a gap, or the like may be defined or configured.

For example, all of RACH occasions contained in a single RACH slot may correspond to PUSCH occasions contained in a single PUSCH slot. In other words, correspondence relation between the RACH slot and the PUSCH slot is in a one-to-one manner.

For example, suppose that a slot containing RACH occasions #0 to #2 is slot #3, and a relative position (start position) of a slot (which may be referred to as a PUSCH slot) containing PUSCH occasions #0 to #2 is "one slot after the start position of a slot containing RACH occasions #0 to #2," and moreover that, it is defined or configured that a time length of one PUSCH occasion is 4 symbols and PUSCH occasions #0 to #2 are arranged continuously (without time gap).

At this time, if the user terminal 20 selects RACH occasion #2, the user terminal 20 specifies slot #4 as a slot including PUSCH Occasions #0 to #2, and determines a resource starting from symbol #8 next to PUSCH occasions #0 and #1 starting from symbol #0 of slot #4 to be a resource of PUSCH occasion #2 used with the RACH occasion #2 for transmission of a MsgA.

The value of the relative position described above is a value representing a time length from the start position of a slot containing "a plurality of RACH occasions" to the start position of a slot containing "a plurality of PUSCH occasions." However, this is an example. The value of the relative position may be a value representing a time length from the end position of a slot containing "a plurality of RACH Occasions" to the start position of a slot containing "a plurality of PUSCH Occasions," or a value representing a time length from the end position of a slot containing "a plurality of RACH Occasions" to the end position of a slot containing "a plurality of PUSCH Occasions," or a value representing a time length from the start position of a slot containing "a plurality of RACH Occasions" to the end position of a slot containing "a plurality of PUSCH occasions," or any other value.

Referring to FIG. 7(c), an operation example of the user terminal 20 according to the Example 1-2-3 will be described. In FIG. 7(c), a time domain position of a PO corresponding to a RO is determined by a time length from the start position of a slot containing RO #0 to #2 including the RO to the start position of a slot containing PO #0 to PO #2 including the PO and a position of the PO in PO #0 to PO #2.

For example, if the user terminal 20 selects RO #1 from among RO #0 to #2 based on received power of a SSB, the user terminal 20 determines a resource arranged next to PO #0 starting from symbol #0 of a slot having a start position after a time length indicated by A from the start position of a slot including RO #0 to #2 including RO #1, as a resource of PO #1. For example, if a plurality of POs are continuously arranged and each PO is 4 symbols long, the user terminal 20 determines a position 4 symbols after the start position of PO #0 as the start position of PO #1.

According to the Example 1, the user terminal 20 can properly determine a time domain position of a PUSCH occasion corresponding to a RACH occasion.

Example 2

In Example 2, a method for specifying a resource amount (which may be also referred to as a size) of a time domain resource of a PUSCH occasion will be described. That is, in the Example 2, how the user terminal 20 determines a resource amount of a time domain resource of a PUSCH occasion will be described.

For determining a position of a PUSCH occasion time domain resource, the determination method described in Example 1 may be applied, or a determination method other than the determination method described in Example 1 may be applied.

As for a determination method of a position and a size of a frequency domain resource of a PUSCH occasion, the determination method described in Examples 3 and 4 may be applied respectively, or a determination method other than the determination method described in Examples 3 and 4 may be applied.

Example 2 is divided into Example 2-1 and Example 2-2, and each of them is described in the following.

Example 2-1

In Example 2-1, the user terminal 20 determines an amount of a time domain resource of a PUSCH occasion used for transmitting a MsgA to be the same as an amount of time domain resource of a RACH occasion corresponding to the PUSCH occasion.

Determining an amount of a time domain resource of a PUSCH occasion to be the same as an amount of a time domain resource of a RACH occasion corresponding to the PUSCH occasion is one example (example of 1 time) of determining an amount of a time domain resource of a PUSCH occasion based on an amount of a time domain resource of a RACH occasion corresponding to the PUSCH occasion. For example, an amount of a time domain resource of a PUSCH occasion may be one of two times, three times, . . . , N times (N is an integer equal to or grater than 1) of an amount of a time domain resource of a RACH occasion corresponding to that PUSCH occasion. N which specifies the number of times may be specified in the specification or may be configured from the base station apparatus 10 to the user terminal 20.

For example, when the user terminal 20 uses a preamble format in which an amount of a time domain resource is 2 symbols for a RACH occasion used for transmitting a MsgA, the user terminal 20 determines an amount of a time domain resource of a PUSCH occasion corresponding to the RACH occasion as 2 symbols.

An example of operation of the user terminal 20 according to the Example 2-1 will be described with reference to FIG. 8. For example, if the user terminal 20 selects RO #0 from among RO #0 to #2 based on received power of a SSB, the user terminal 20 determines the start position of the corresponding PO #0 by the method of the Example 1. Further, the user terminal 20 determines a resource amount the same as a time domain resource amount of RO #0 (here, 4 symbols) as a time domain resource amount of PO #0.

That is, in this case, the user terminal 20 transmits a preamble with a 4-symbol-long RO #0 and transmits data (e.g., Msg3) with a 4-symbol-long PO #0.

Regarding a time domain position of the PUSCH occasion, in the case of Example 2-1, all values (notified or defined) indicating a relative position between a PUSCH occasion and a RACH occasion may be common. For example, in FIG. 8, a time length from the start position of RO #0 to the start position of PO #0, a time length from the start position of RO #1 to the start position of PO #1, and a time length from the start position of RO #2 to the start position of PO #2 are the same values, and the "same value" may be defined as the common value or may be configured from the base station apparatus 10 to the user terminal 20.

In this case, the number of PUSCH occasions contained in one slot may be the same as the number of RACH occasions contained in one slot.

Example 2-2

In the Example 2-2, an amount of a time domain resource of a PUSCH occasion used for transmitting a MsgA is notified from the base station apparatus 10 to the user terminal 20 and is configured to the user terminal 20. The user terminal 20 determines the resource amount configured from the base station apparatus 10 as an amount of a time domain resource of the PUSCH occasion that is used for transmitting a MsgA. This configuration may be performed with an RRC message, a MAC CE, or a DCI.

An amount of a time domain resource of a PUSCH occasion used to transmit a MsgA may be specified in the specification, etc., and the user terminal 20 may use the value in accordance with the specification.

An example of an operation in the case where an amount of a time domain resource of a PUSCH occasion used for transmitting a MsgA is specified or configured to be 7 symbols will be described with reference to FIG. 6, which is used in Example 1-1.

If the user terminal 20 selects RO #2 from among RO #0 to #2 based on received power of a SSB, the user terminal 20 determines a resource having a start position after a time length indicated by C from the start position of RO #2 and having a time length of 7 symbols as a resource of the PO #2.

Other Examples

Example 2 may be applied when specifying a relative position between PUSCH occasion and RACH occasion as described in Example 1, and may be applied when a position of the time domain of PUSCH occasion is specified as an absolute position (e.g., subframe position, slot position, symbol position, etc.).

Figure 5:
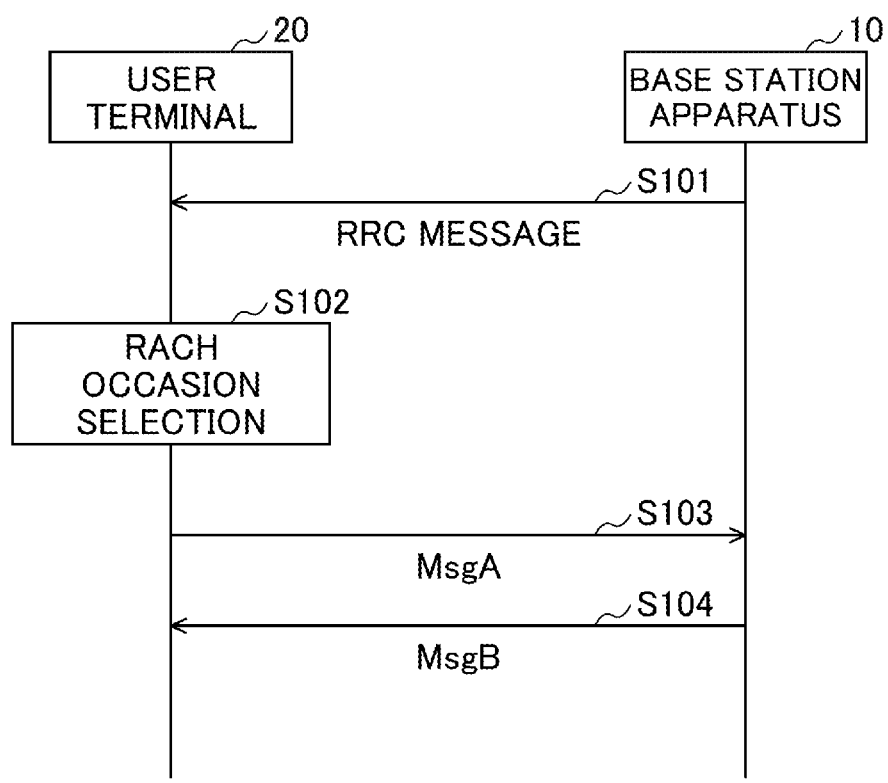
FIG. 5 is a diagram showing a basic operation example.

In the case where a time domain position of a PUSCH occasion is specified as an absolute position (e.g., subframe position, slot position, symbol position, etc.), for example, a time domain position of a PUSCH occasion corresponding to each RACH occasion is notified (configured) from the base station apparatus 10 to the user terminal 20 by an RRC message of S101 of FIG. 5, together with one or more positions of one or more RACH occasions.

Figure 8:
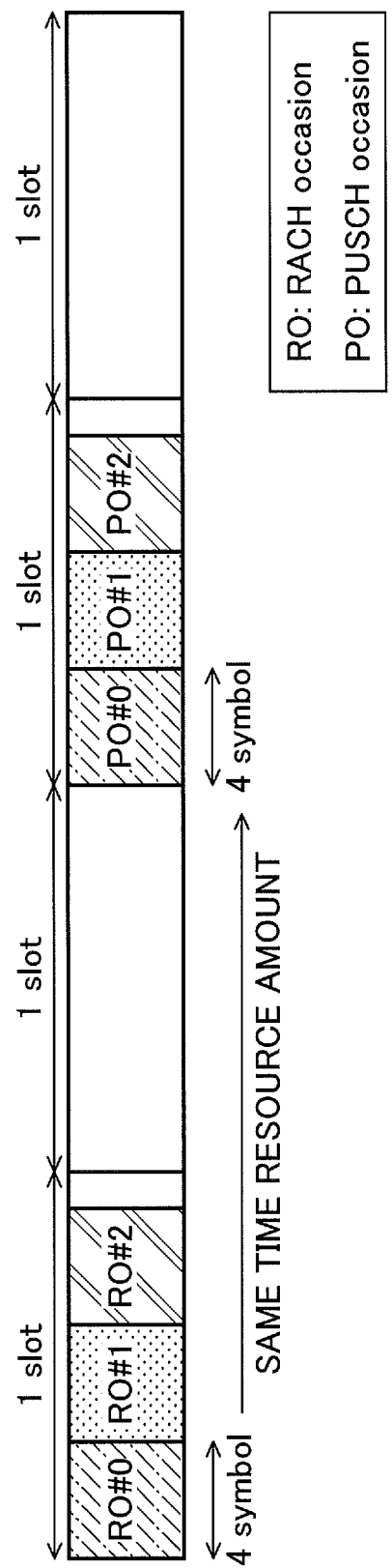
FIG. 8 is a diagram for explaining Example 2-1.

In this case, for example, in the example of FIG. 8, when the user terminal 20 selects RO #1, the user terminal determines PO #1 having the configured time domain position and having the same time length as the time length of the RO #1, and uses the RO #1 and the PO #1 for transmission of a MsgA.

As a method for specifying an absolute position of a PUSCH occasion, it can be specified using an index in a PRACH configuration table (Table 6.3.3.2-2, etc. in Non-Patent Document 4). Specifically, the absolute position of the PUSCH occasion may be specified using, for example, an RRC information element similar to prach-ConfigurationIndex described in Non-Patent Document 3.

That is, the absolute position of the PUSCH occasion may be specified by the same principle as that of a RACH occasion. Also in this case, the number of PUSCH occasions contained in a slot may be the same as the number of RACH occasions contained in a slot.

According to the Example 2, the user terminal 20 can appropriately determine an amount of time domain resource of a PUSCH occasion corresponding to a RACH occasion.

Example 3

In Example 3 a method for specifying a position of a frequency domain resource of a PUSCH occasion will be described. That is, in the Example 3, how the user terminal 20 determines a position of the frequency domain resource of the PUSCH occasion will be described.

For a size of a frequency domain resource (bandwidth) of a PUSCH occasion, a determination method described in Example 4 may be applied, or a determination method other than the determination method described in Example 4 may be applied.

For a method of determining a position and a size of a time domain resource of a PUSCH occasion, the determination method described in Examples 1 and 2 may be applied, respectively, or a determination method other than the determination method described in Examples 1 and 2 may be applied.

Since Example 3 is divided into Examples 3-1 and 3-2, each of them will be described in the following. In the following description, "lower" to "upper" in the frequency domain is the direction in which a value of a frequency increases. However, "upper" to "lower" in the frequency domain may be the direction in which the value of the frequency increases. "Upper end" and "Lower end" may be exchanged in the following description.

Example 3-1

In Example 3-1, the user terminal 20 determines a frequency domain position of a PUSCH occasion used for transmission of a MsgA based on a relative position from a frequency domain position (a lower end or an upper end of the frequency direction) of a RACH occasion corresponding to the PUSCH occasion.

For example, suppose that the user terminal 20 has selected RACH occasion #1 as a RACH occasion corresponding to a selected SSB. The user terminal 20 knows a frequency domain resource of the RACH occasion #1 based on configuration made by the base station apparatus 10.

For example, assuming that the lower end of RACH occasion #1 is F (a number of frequency, a resource block number, a subchannel number, a subcarrier number, or any other value, the same shall apply hereinafter) and that a relative position (the lower end) of PUSCH occasion #1 used with RACH occasion #1 for transmission of a MsgA is "a position obtained by adding ΔF from the lower end of RACH occasion #1," the user terminal 20 determines a resource having F+ΔF as the lower end in the frequency domain to be a resource of PUSCH occasion #1 used with RACH occasion #1 for transmission of a MsgA. ΔF may be 0, positive, or negative.

The value of the relative position above is a value indicating a frequency-direction width (also referred to as bandwidth) from the lower end of the RACH occasion to the lower end of the PUSCH occasion. However, this is an example. The value of the relative position may be a value that represents a bandwidth from the upper end of the RACH occasion to the lower end of the PUSCH occasion, a value that represents a bandwidth from the upper end of the RACH occasion to the upper end of the PUSCH occasion, a value that represents a bandwidth from the lower end of the RACH occasion to the upper end of the PUSCH occasion, or any other value.

The width of the frequency direction representing the above-described relative position may be a value preconfigured to the user terminal 20 (that is, a value defined by a specification or the like) or a value configured from the base station apparatus 10 to the user terminal 20. This configuration can be done with a RRC message, a MAC CE, or a DCI. The same applies to the width of the frequency direction representing a relative position in Example 3-2.

Figure 9:
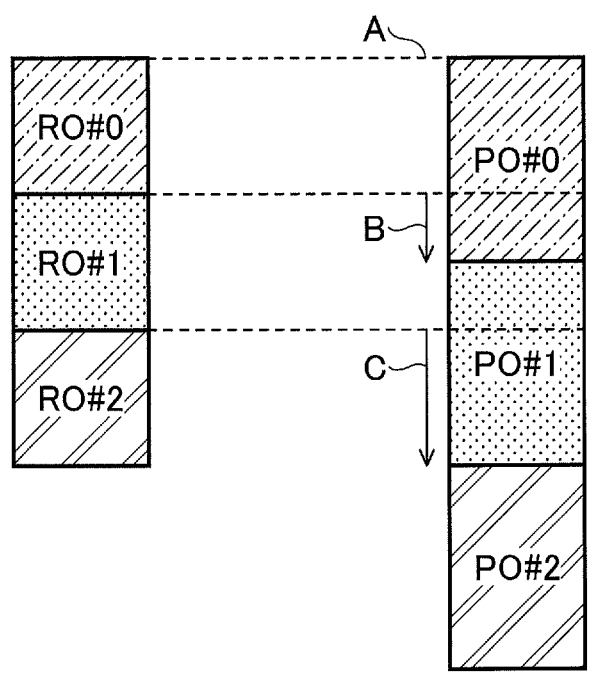
FIG. 9 is a diagram for explaining Example 3-1.

Referring to FIG. 9, an operation example of the user terminal 20 according to the Example 3-1 is described.

In FIG. 9, a frequency domain position of a PO corresponding to a RO is designated as a frequency direction width from the upper end of the RO to the upper end of the PO.

For example, if the user terminal 20 selects RO #1 from among RO #0 to #2 based on received power of a SSB, the user terminal 20 determines a resource having a frequency position, that is an upper end, apart from the upper end of RO #1 by a bandwidth represented by B, as a resource of PO #1.

In the example of FIG. 9, for each of PO #0 to #2 corresponding to RO #0 to #2, a bandwidth representing a relative position is separately defined or configured as A (=0), B, and C. However, this is an example. A bandwidth representing a relative position common to PO #0 to #2 corresponding to RO #0 to #2 may be specified or configured.

Example 3-2

In Example 3-2, the user terminal 20 determines a frequency domain position of a PUSCH occasion used for transmission of a MsgA based on a relative position from a position (lower end or upper end of the frequency direction) of the whole of a plurality of FDMed (frequency multiplexed) RACH occasions including the RACH occasion corresponding to the PUSCH occasion. Example 3-2 is divided into Examples 3-2-1 and 3-2-2, thus, each of them will be described.

Example 3-2-1

In Example 3-2-1, a position per PUSCH occasion is specified.

For example, assuming that the lower end of the whole FDMed RACH occasions including RACH occasion #1 is F, and that a relative position (the lower end) of PUSCH occasion #1 used with RACH occasion #1 for transmission of a MsgA is "a position obtained by adding ΔF from the lower end of the whole FDMed RACH occasions including RACH occasion #1," the user terminal 20 determines a PUSCH occasion having F+ΔF as its lower end to be PUSCH occasion #1 used with RACH occasion #1 for transmission of a MsgA.

The value of the relative position described above is a value representing a bandwidth from the lower end of the whole FDMed RACH occasions including the RACH occasion #1 to the lower end of the PUSCH occasion. However, this is an example. The value of the relative position may be a value representing a bandwidth from the upper end of the whole RACH occasions to the lower end of the PUSCH occasion, a value representing a bandwidth from the upper end of the whole RACH occasions to the upper end of the PUSCH occasion, a value representing a bandwidth from the upper end of the whole RACH occasions to the lower end of the PUSCH occasion, or other values.

As in Example 3-1, a common relative position for each PUSCH occasion may be defined or configured, or an independent and separate relative position may be defined or configured.

Example 3-2-2

In Example 3-2-2, a relative position is specified in units of multiple PUSCH occasions that are FDMed corresponding to multiple RACH occasions that are FDMed.

A method of placement of frequency domain of each PUSCH occasion in "a plurality of PUSCH occasions" may be specified or configured. For example, a method in which a plurality of PUSCH occasions are arranged consecutively, a method in which a plurality of PUSCH occasions are arranged with a gap, or the like may be defined or configured.

For example, all PUSCH occasions corresponding to a plurality of RACH occasions that are FDMed may be FDMed. Example 3 may also be applied when a plurality of PUSCH occasions corresponding to a plurality of FDMed RACH occasions are located at different time positions.

For example, suppose that the lower end of RACH occasions #0 to #2 is F, and that a relative position (the lower end) of PUSCH occasions #0 to #2 corresponding to the RACH occasions #0 to #2 is F+ΔF, and furthermore, that it is defined or configured that a bandwidth of one PUSCH occasion is PW and the PUSCH occasions #0 to #2 are arranged consecutively (without frequency GAP).

At this time, if the user terminal 20 selects RACH occasion #2, the user terminal 20 determines a resource having F+ΔF+2PW as a lower end next to PUSCH occasions #0 and #1 having F+ΔF as its lower end to be a resource of PUSCH occasion #2 used together with RACH occasion #2 for transmission of a MsgA.

The value of the relative position described above is a value representing a bandwidth from the lower end of "a plurality of RACH occasions" to the lower end of "a plurality of PUSCH occasions." However, this is an example. The value of the relative position may be a value representing a bandwidth from the upper end of "a plurality of RACH occasions" to the lower end of "a plurality of PUSCH occasions", a value representing a bandwidth from the upper end of "a plurality of RACH occasions" to the upper end of "a plurality of PUSCH occasions", a value representing a bandwidth from the lower end of "a plurality of RACH occasions" to the upper end of "a plurality of PUSCH occasions", or any other value.

Referring to FIG. 10(a), an operation example of the user terminal 20 according to the Example 3-2-2 will be described. In FIG. 10(a), a frequency domain position of a PO corresponding to a RO is determined by a bandwidth from the upper end of the FDMed RO #0 to #22 including the RO to the upper end of the FDMed PO #0 to PO #2 including the PO and a position of the PO in the PO #0 to PO #2.

For example, if the user terminal 20 selects RO #1 from among RO #0 to #2 based on received power of a SSB, the user terminal 20 determines a resource, as PO #1, placed in the second position in PO #0 to #2 having its upper end at a position apart from the upper end of RO #0 to #2 including RO #1 by a bandwidth indicated by A. For example, if a plurality of POs are continuously arranged and each PO has a bandwidth of PW, the user terminal 20 determines a position of the upper end of the PO #0+PW as the upper end of the PO #1.

Examples 3-3

In Example 3-3, the user terminal 20 determines a position of a frequency direction resource of a PUSCH occasion as the same position as a corresponding RACH occasion.

For example, all PUSCH occasions corresponding to a plurality of FDMed RACH occasions may be FDMed.

Referring to FIG. 10(b), an operation example of the user terminal 20 according to the Example 3-3 will be described. For example, if the user terminal 20 selects RO #1 from among RO #0 to #2 based on received power of a SSB, the user terminal 20 determines the same frequency domain position as RO #1 to be a frequency domain position of PO #1.

According to the Example 3, the user terminal 20 is able to properly determine a frequency domain position of a PUSCH occasion corresponding to a RACH occasion.

Example 4

In Example 4, a method for specifying a resource amount (which may be referred to as a size or a bandwidth) of a PUSCH occasion frequency domain resource will be described. That is, in Example 4, how the user terminal 20 determines an amount of a frequency domain resource of a PUSCH occasion will be described.

For a position of a frequency domain resource of a PUSCH occasion, the determination method described in Example 3 may be applied, or a determination method other than the determination method described in Example 3 may be applied.

For a determining method of a position and a size of a time domain resource of a PUSCH occasion, the determination method described in Examples 1 and 2 may be applied, respectively, or a determination method other than the determination method described in Examples 1 and 2 may be applied.

Example 4 is divided into Examples 4-1 and 4-2, and each of them is described in the following.

Example 4-1

In Example 4-1, the user terminal 20 determines a frequency domain resource amount of a PUSCH occasion used for transmission of a MsgA to be the same as a frequency domain resource amount of a RACH occasion corresponding to the PUSCH occasion.

Determining a frequency domain resource amount of a PUSCH occasion to be the same as a frequency domain resource amount of a RACH occasion corresponding to the PUSCH occasion is an example of determining a frequency domain resource amount of a PUSCH occasion based on a frequency domain resource amount of a RACH occasion corresponding to the PUSCH occasion (an example of 1 time). For example, a frequency domain resource amount of a PUSCH occasion may be two times, three times, . . . , N times (N is an integer equal to or greater than 1) of a frequency domain resource amount of a RACH occasion corresponding to the PUSCH occasion. The number N indicating times may be specified in the specification or may be configured from the base station apparatus 10 to the user terminal 20.

For example, if a frequency domain resource amount is RW for a RACH occasion used for transmitting a MsgA, the user terminal 20 determines a frequency domain resource amount of a PUSCH occasion corresponding to the RACH occasion as RW.

Figure 11:
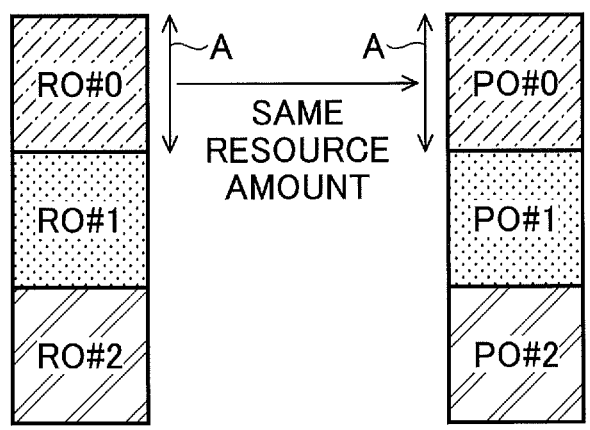
FIG. 11 is a diagram for explaining Example 4-1.

Referring to FIG. 11, an operation example of the user terminal 20 according to the Example 4-1 will be described. For example, if the user terminal 20 selects RO #0 from among RO #0 to #2 based on received power of a SSB, the user terminal 20 determines a start position of corresponding PO #0 by the method of the Example 3, for example. Further, the user terminal 20 determines a resource amount the same as the frequency domain resource amount (here, A) of RO #0 as a frequency domain resource amount of PO #0.

In the case of Example 4-1, values (notified or specified) representing a relative position may all be common between a PUSCH occasion and a RACH occasion with respect to a frequency domain position of a PUSCH occasion. For example, in FIG. 10(a), a bandwidth from the upper end of RO #0 to the upper end of PO #0, a bandwidth from the upper end of RO #1 to the upper end of PO #1, and a bandwidth from the upper end of RO #2 to the upper end of PO #2 are the same value, and the "same value" may be defined as the common value or may be configured from the base station apparatus 10 to the user terminal 20.

Example 4-2

In the Example 4-2, a frequency domain resource amount of a PUSCH occasion used for transmitting a MsgA is notified from the base station apparatus 10 to the user terminal 20 and is configured to the user terminal 20. The user terminal 20 determines the resource amount configured from the base station apparatus 10 as frequency domain resource amount of a PUSCH occasion used for transmitting a MsgA. This configuration may be performed by a RRC message, a MAC CE, or a DCI.

In addition, a frequency domain resource amount of a PUSCH occasion used for transmitting a MsgA may be specified in the specification, etc., and the user terminal 20 may use a value in accordance with the specification.

Other Examples

Example 4 may be applied when specifying a relative position of frequency domain between a PUSCH occasion and a RACH occasion, as described in Example 3, or when designating a frequency domain position of a PUSCH occasion as an absolute position.

When a frequency domain position of a PUSCH occasion is specified as an absolute position, for example, in the RRC message of S101 of FIG. 5, together with one or more frequency domain positions of one or more of RACH occasions, a frequency domain position of a PUSCH occasion corresponding to each RACH occasion is notified (configured) from the base station apparatus 10 to the user terminal 20

According to the Example 4, the user terminal 20 can appropriately determine a frequency domain resource amount of a PUSCH occasion corresponding to a RACH occasion.

Example 5

Next, Example 5 will be described. Example 5 is an example that can be applied in combination with any of Examples 1-4.

In Examples 1 to 4, a case in which a RACH occasion and a PUSCH occasion correspond to each other on a one-to-one basis is described. However, the method of specifying a position and a resource amount of a PUSCH occasion described in Examples 1 to 4 may be applied to a case in which a RACH occasion and a PUSCH occasion correspond to each other on a one-to-one, one-to-many, or many-to-one basis.

For example, if a RACH occasion corresponds to two PUSCH occasions, a position of the whole two PUSCH occasions may be specified or configured, or a position of each PUSCH occasion may be specified or configured. The same applies to both time and frequency domains.

When a single RACH occasion corresponds to two PUSCH occasions, a resource amount of the whole two PUSCH occasions may be specified or configured, or a resource amount of each PUSCH occasion may be specified or configured. The same applies to both time and frequency domains.

FIGS. 12(*a*) and (*b*) illustrate an example where one RACH occasion corresponds to two PUSCH occasions.

FIG. 12(*a*) shows an example in which a frequency domain position of the whole two PUSCH occasions is defined or configured. For example, when the user terminal 20 selects RO #0 and selects PO #0-1 as a corresponding PO, the user terminal 20 determines a frequency position apart from the upper end of RO #0 by A as the upper end of "PO #0-0 and PO #0-1," and determines a position apart from it by a bandwidth of PO #0-0 as the upper end of PO #0-1.

FIG. 12(*b*) shows an example in which each frequency domain position of two PUSCH occasions is defined or configured. For example, when the user terminal 20 selects RO #0 and selects PO #0-1 as a corresponding PO, the user terminal 20 determines a frequency position apart from the upper end of RO #0 by B as the upper end of PO #0-1.

FIGS. 13(*a*) and (*b*) illustrate an example where two RACH occasions correspond to one PUSCH occasion.

FIG. 13(*a*) shows an example in which a frequency domain position of PO #0 is defined or configured as a relative position from the upper end of the whole two RACH occasions. For example, when the user terminal 20 selects RO #0-0 and selects PO #0 as a corresponding PO, the user terminal 20 determines a frequency position apart from the upper end of RO #0-0 by A as the upper end of PO #0.

FIG. 13(*b*) shows an example in which a frequency domain position of PO #0 is defined or configured as a relative position from the upper end of the second RACH occasion of the two RACH occasions. For example, when the user terminal 20 selects RO #0-0 and selects PO #0 as the corresponding PO, the user terminal 20 determines a frequency position apart from the upper end of RO #0-1 by A as the upper end of PO #0.

According to the Example 5, the user terminal 20 can apply Examples 1-4 even when a RACH occasion and a PUSCH occasion correspond to each other on many-to-one, one-to-many or many-to-many basis.

<Apparatus Configuration>

Next, an example of functional configuration of the base station apparatus 10 and the user terminal 20 that execute the processing and operations described so far will be described. The base station apparatus 10 and the user terminal 20 include a function for implementing the Examples 1-5 explained above. However, each of the base station apparatus 10 and the user terminal 20 may have only the functions of any one of the Examples 1-5.

<Base Station Apparatus 10>

Figure 14:
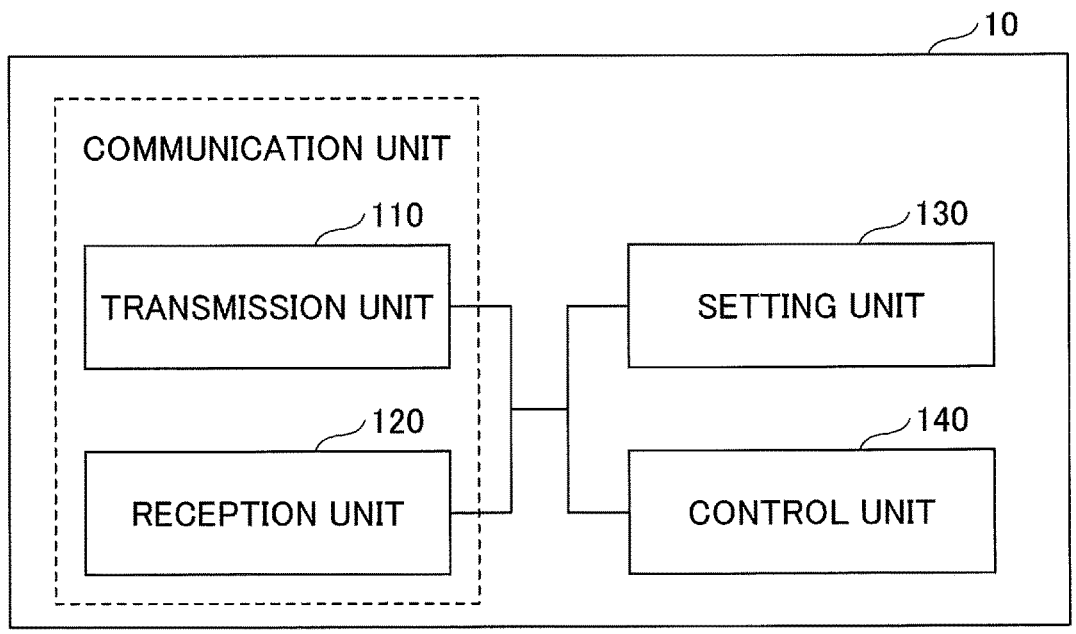
FIG. 14 is a diagram showing an example of a functional configuration of a base station apparatus 10 according to an embodiment of the present invention.

FIG. 14 is a drawing illustrating an example of a functional configuration of the base station apparatus 10. As illustrated in FIG. 14, the base station apparatus 10 includes a transmitting unit 110, a receiving unit 120, a setting unit 130, and a control unit 140. The functional configuration illustrated in FIG. 14 is only an example. As long as the operation according to the embodiment of the present invention can be executed, the functions may be divided in any way, and the functional units may be given any names. The transmitting unit 110 and the receiving unit 120 may be referred to as a communication unit.

The transmitting unit 110 includes a function of generating signals to be transmitted to the user terminal 20 and wirelessly transmitting the signals. The receiving unit 120 includes a function of receiving various types of signals transmitted from the user terminal 20 and acquiring, for example, information on a higher layer from the received signals. Further, the transmitting unit 110 has a function of transmitting NR-PSS, NR-SSS, NR-PBCH, a DL/UL control signal, a DL data or the like to the user terminal 20.

The setting unit 130 stores configuration information configured in advance and various configuration information to be transmitted to the user terminal 20 in a storage device and reads out the configuration information from the storage device as needed. The contents of the configuration information are, for example, preamble resource, PUSCH resource, RAR window length, and the like used for random access procedure.

The control unit 140 performs, for example, resource allocation and control of the entire base station apparatus 10. A function unit related to signal transmission in the control unit 140 may be included in the transmission unit 110, and a function unit related to signal reception in the control unit 140 may be included in the receiving unit 120. The transmission unit 110 and the reception unit 120 may be called a transmitter and a receiver, respectively.

<User Terminal 20>

Figure 15:
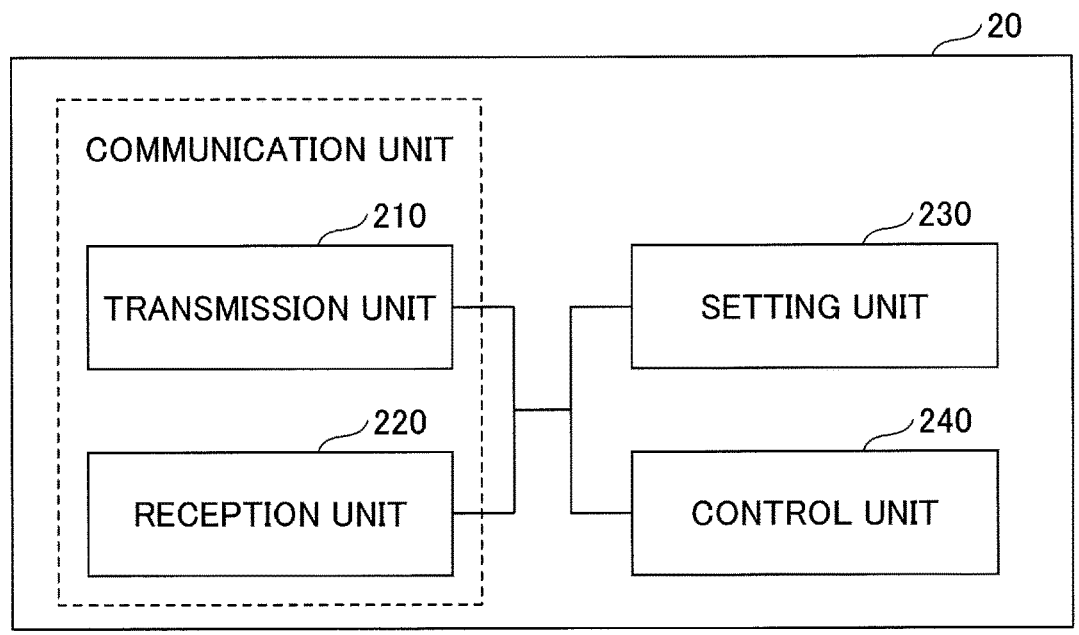
FIG. 15 is a diagram showing an example of a functional configuration of a user terminal 20 according to an embodiment of the present invention.

FIG. 15 is a drawing illustrating an example of a functional configuration of the user terminal 20. As illustrated in FIG. 15, the user terminal 20 includes a transmitting unit 210, a receiving unit 220, a setting unit 230, and a control unit 240. The functional configuration illustrated in FIG. 10 is merely an example. As long as the operation according to the embodiment of the present invention can be executed, the functions may be divided in any way, and the functional units may be given any names.

The transmitting unit 210 generates a transmission signal from transmission data and wirelessly transmits the transmission signal. The receiving unit 220 wirelessly receives various types of signals, and acquires a signal in a higher-layer from the received signal in the physical layer. The transmitting unit 210 and the receiving unit 220 may be referred to as a communication unit.

The setting unit 230 stores in a storage device various types of configuration information received from the base station apparatus 10 by the receiving unit 220 and reads out the configuration information from the storage device as needed. The setting unit 230 also stores configuration information configured in advance. The contents of the configuration information are, for example, preamble resource, PUSCH resource, RAR window length, and the like used for random access procedure.

The control unit 240 performs control as explained in the Examples 1-5. A functional unit configured to transmit signals in the control unit 240 may be included in the transmitting unit 210, and a functional unit configured to receive signals in the control unit 240 may be included in the receiving unit 220. The transmitting unit 210 and the receiving unit 220 may be referred to as a transmitter and a receiver.

The terminal as the user terminal 20 is configured as at least the terminal described in the following items, for example.

(Item 1)

A terminal including:
- a control unit configured to determine a position of a PUSCH resource to be used in a first step in a two step random access procedure based on a relative position with respect to a position of a preamble resource; and
- a transmission unit configured to transmit a message of the first step using the preamble resource and the PUSCH resource.

(Item 2)

The terminal as described in item 1, wherein the position is a time domain position, and the control unit determines a position of the PUSCH resource based on a relative position with respect to a position of a slot including the preamble resource.

(Item 3)

The terminal as described in item 1 or 2, wherein the position is a frequency domain position, and the control unit determines a position of the PUSCH resource based on a relative position with respect to a position of the whole of frequency multiplexed one or more preamble resources including the preamble resource.

(Item 4)

A terminal including:
- a control unit configured to determine a resource amount of a PUSCH resource to be used in a first step in a two step random access procedure based on a resource amount of a preamble resource, or as a resource amount configured from a base station apparatus; and
- a transmission unit configured to transmit a message of the first step using the preamble resource and the PUSCH resource.

(Item 5)

The terminal as described in item 4, wherein the control unit determines, as the time domain position of the PUSCH resource, a time domain position designated by an index of the same type as that of an index used for designating a time domain position of the preamble resource.

(Item 6)

The terminal as described in any one of items 1-5, wherein a preamble resource and a PUSCH resource that are used in the two step random access procedure are associated with each other on a one-to-one, many-to-one, one-to-many, or many-to-many basis.

According to any of items 1-6, there is provided a technique that enables the user terminal to determine properly a PUSCH resource used in the first step in a two-step random access procedure.

<Hardware Configuration>

The block diagrams (FIGS. 14 and 15) used for explaining the above embodiment illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmitting unit or a transmitter. As described above, a method for implementing these functions is not particularly limited.

Figure 16:
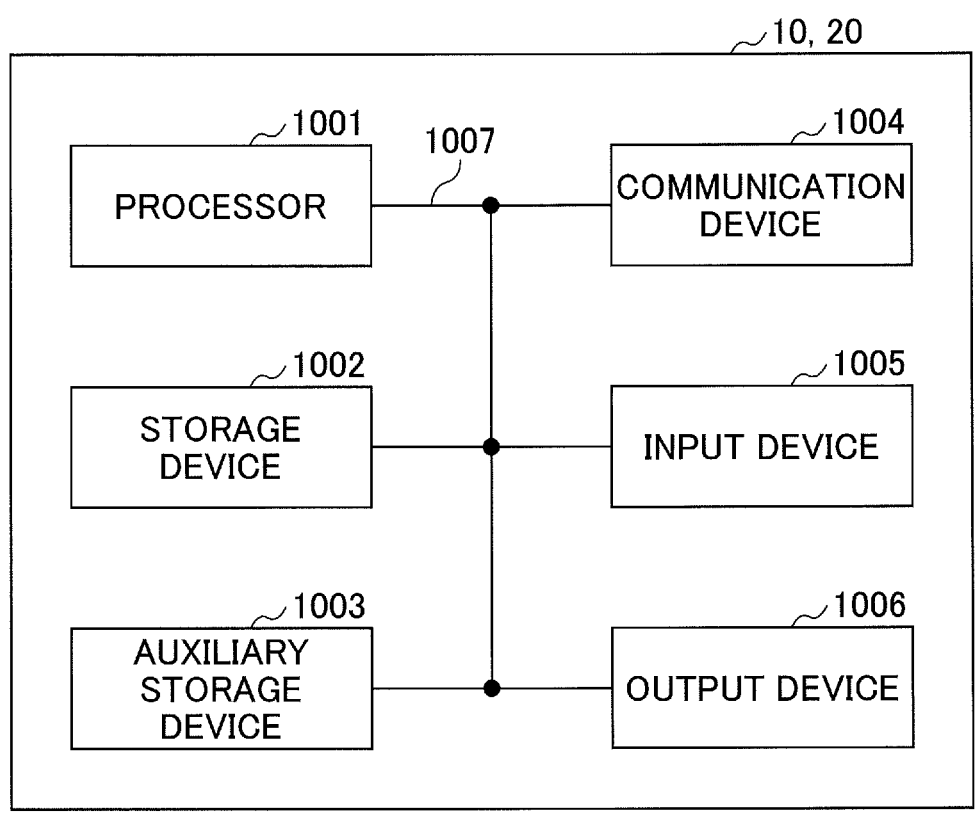
FIG. 16 is a diagram illustrating an example of a hardware configuration of the base station apparatus 10 or the user terminal 20 according to an embodiment of the present invention.

For example, the base station apparatus 10, the user terminal 20, and the like according to one embodiment of the present disclosure may function as a computer that performs processing of a wireless communication according to the present disclosure. FIG. 16 is a drawing illustrating an example of a hardware configuration of the base station apparatus 10 or the user terminal 20 according to an embodiment of the present disclosure. Each of the base station apparatus 10 and user terminal 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station apparatus 10 and the user terminal 20 may be configured to include one or more of the devices illustrated in drawings, or may be configured not to include some of the devices.

Each function of the base station apparatus 10 and the user terminal 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be realized by the processor 1001.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the base station apparatus 10, as illustrated in FIG. 14, may be implemented by a control program that is stored in the storage device 1002 and that is executed by the processor 1001. Also, for example, the control unit 240 of the user terminal 20, as illustrated in FIG. 15, may be implemented by a control program that is stored in the storage device 1002 and that is executed by the processor 1001. Explanation has been provided above for the case in which the above various processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The auxiliary storage device 1003 may be referred to as an auxiliary storage device. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station apparatus 10 and the user terminal 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

<Supplements to Embodiment>

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 10 and the user terminal 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user terminal 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user terminal 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. But the another network node may be a combination of a plurality of other network nodes (for example, a MME and a S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUSCH, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

In addition, a base station apparatus according to the present disclosure may be read as a user terminal. For example, each aspect or embodiment of the present disclosure may be applied to a configuration in which communication between a base station apparatus and a user terminal is replaced by communication between a plurality of user terminals 20 (that may be called D2D (Device-to-Device), V2X (Vehicle-to-Everything), or the like). In this case, a user terminal 20 may have above-described functions of the base station apparatus 10. In this regard, a word such as "up" or "down" may be read as a word corresponding to communication between terminals (for example, "side"). For example, an uplink channel, a downlink channel, or the like may be read as a side channel.

Similarly, a user terminal according to the present disclosure may be replaced with a base station apparatus. In this case, a base station apparatus may have above-described functions of the user terminal.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user terminal 20 to assign, in TTI units, radio resources (such as frequency bandwidths, transmission power, and the like that can be used by each user terminal 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, SS block or CSI-RS is an example of a synchronization signal or a reference signal.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

DESCRIPTION OF SYMBOLS 10 base station apparatus
110 transmitting unit
120 receiving unit
130 setting unit
140 control unit
20 user terminal
210 transmitting unit
220 receiving unit
230 setting unit
240 control unit
1001 processor
1002 storage device
1003 auxiliary storage device
1004 communication device
1005 input device
1006 output device

The invention claimed is:
1. A terminal comprising:
a receiver configured to receive configuration information on a two-step random access procedure;

a processor configured to determine arrangement of a PUSCH resource based on a number of slots, in an active uplink (UL) bandwidth part (BWP) numerology, where the PUSCH resources are contiguously placed and at least one of pieces of information, that are included in the configuration information, related to a first step of the two-step random access procedure, wherein the pieces of information are:
- a relative slot position of the PUSCH resource with respect to a slot position of a RACH resource,
- a number of PUSCH resources in a time domain,
- a start symbol position and a symbol length of the PUSCH resource, and
- a symbol length indicating an interval separating between the PUSCH resources; and a transmitter configured to transmit a message of the first step by using the RACH resource and the PUSCH resource.

2. The terminal as claimed in claim 1, wherein the processor is configured to determine arrangement of the PUSCH resource based on at least one of pieces of information, that is included in the configuration information, related to the first step of the two-step random access procedure, wherein the pieces of information are:
- a position of the PUSCH resource in a frequency domain,
- a number of the PUSCH resources in the frequency domain,
- a number of the PUSCH resources contiguously placed in the frequency domain, and
- a band indicating an interval separating between the PUSCH resources in the frequency domain.

3. A communication system comprising:
a base station comprising:
- a transmitter of the base station configured to transmit configuration information on a two-step random access procedure; and
- a receiver of the base station configured to receive a message of a first step in the two-step random access procedure from the terminal, and a terminal comprising:
- a receiver of the terminal configured to receive the configuration information from the base station;
- a processor configured to determine arrangement of a PUSCH resource based on a number of slots, in an active uplink (UL) bandwidth part (BWP) numerology, where the PUSCH resources are contiguously placed and at least one of pieces of information, that are included in the configuration information, related to the first step of the two-step random access procedure, wherein the pieces of information are:
  - a relative slot position of the PUSCH resource with respect to a slot position of a RACH resource,
  - a number of PUSCH resources in a time domain,
  - a start symbol position and a symbol length of the PUSCH resource, and
  - a symbol length indicating an interval separating between the PUSCH resources; and
- a transmitter of the terminal configured to transmit a message of the first step to the base station by using the RACH resource and the PUSCH resource.

4. A communication method of a terminal, comprising:
receiving configuration information on a two-step random access procedure;
determining arrangement of a PUSCH resource based on a number of slots, in an active uplink (UL) bandwidth part (BWP) numerology, where the PUSCH resources are contiguously placed and at least one of pieces of information, that are included in the configuration information, related to a first step of the two-step random access procedure, wherein the pieces of information are:
- a relative slot position of the PUSCH resource with respect to a slot position of a RACH resource,
- a number of PUSCH resources in a time domain,
- a start symbol position and a symbol length of the PUSCH resource, and
- a symbol length indicating an interval separating between the PUSCH resources; and transmitting a message of the first step by using the RACH resource and the PUSCH resource.

* * * * *